June 18, 1935.  L. L. LEVY  2,005,428
SHOE SIZE MEASURING DEVICE
Filed Oct. 30, 1933
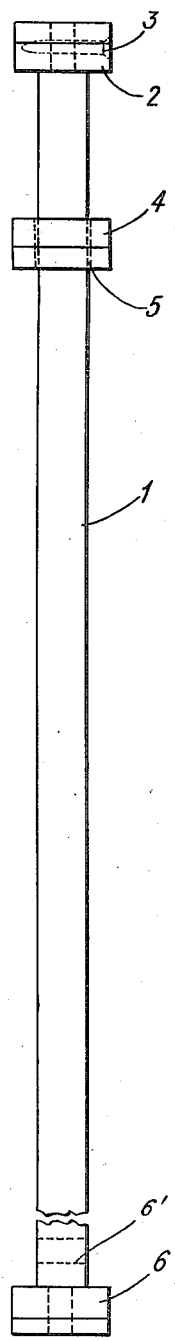
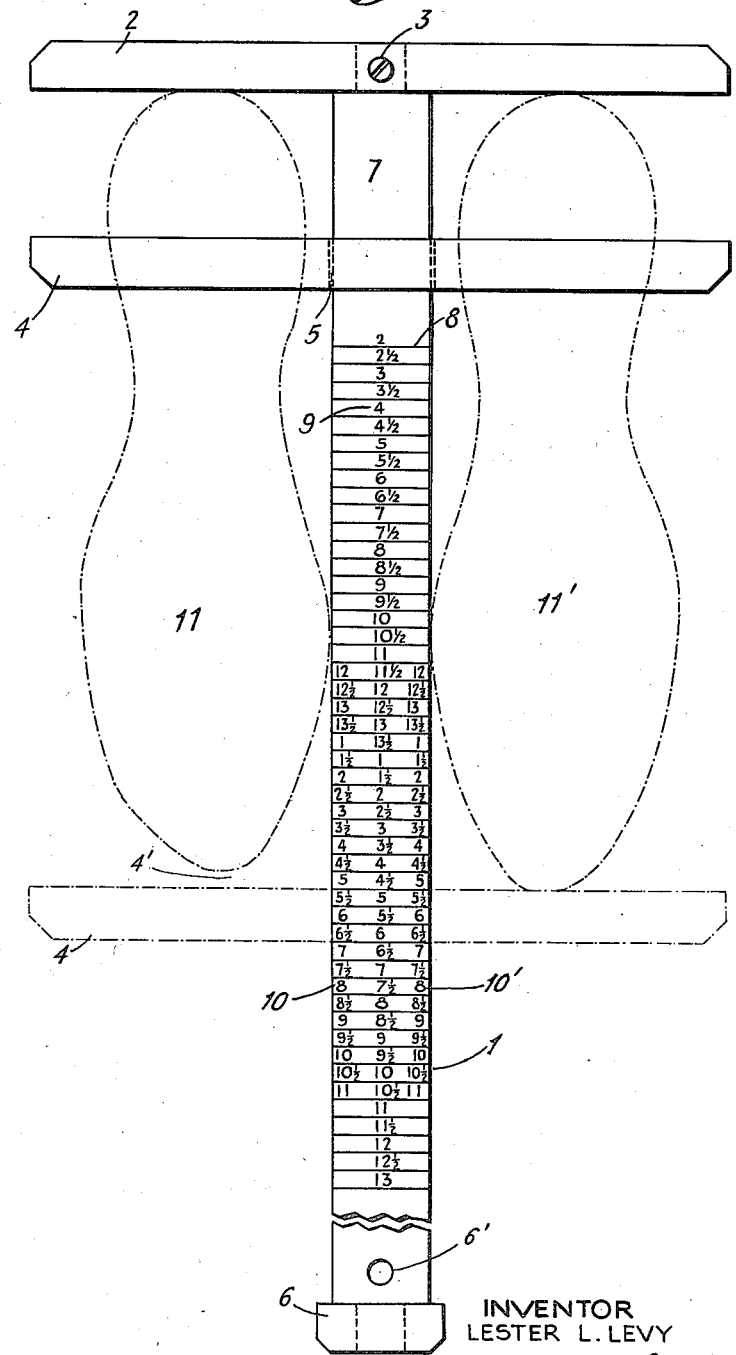
INVENTOR
LESTER L. LEVY
BY
ATTORNEY Patented June 18, 1935

2,005,428

UNITED STATES PATENT OFFICE 2,005,428

SHOE SIZE MEASURING DEVICE

Lester L. Levy, Brooklyn, N. Y.

Application October 30, 1933, Serial No. 695,857

4 Claims. (Cl. 33—3)

My present invention relates to size measuring devices, and more particularly to a novel and improved type of shoe size measuring appliance.

Actual experience with shoe size measuring devices in use at the present time has demonstrated that they are all unreliable in the correct fitting of the "hard to fit" shoe customer. It is well known that misfitting in shoes, especially in the case of women's shoes, is the cause of loss of customers, waste of sales time and increase in the "slightly used shoes" inventory. These undesirable results may be eliminated by a correct and reliable determination of the shoe size in the first instance.

I have found that one of the greatest sources of error in all conventional devices which measure shoe size resides in the fact that only one foot is actually measured to ascertain the shoe size. This mode of procedure is fundamentally unsound because even in the so-called average pair of feet there exists a dimensional variation between the two feet. As this variation becomes more and more pronounced it is obvious that a measuring of the shorter of the two feet must necessarily result in a misfitting of the longer foot. Since there is no general rule with respect to which foot is the longer one, it is easy to see why prior measuring devices mislead the shoe salesman.

Hence it may be stated that it is one of the main objects of the present invention to provide a shoe size measuring appliance wherein the sizes of both feet of the individual are measured simultaneously thereby permitting the salesman to instantly detect a size variation between the feet and thus avoid, even in the so-called average size cases, the possibility of a misfit.

Another source of error in conventional shoe size measuring devices resides in the fact that the sole of the foot chosen to be measured is placed on the rule portion of the device, the customer being seated at the time. Experience has taught me that this manner of measuring a foot is apt to lead to an unsatisfactory fitting because the weight of the body is not on the feet. Accordingly, it may be stated that it is another important object of the present invention to provide a shoe size measuring device wherein both feet are simultaneously measured, the device being so constructed that the soles of the feet are placed directly upon the ground on either side of the rule portion and not upon the latter, and the customer standing during the actual measurement.

A still further source of error in shoe measuring devices heretofore used arises because of the use of but a single size scale on the rule portion. The objection to such a construction will be realized when it is pointed out that in certain constructions of women's shoes the shoe size selected should be a half size larger than would be the case in other constructions for the same person. This is true in the case of welt, McKay and very short running last constructions. Clearly, then, when using a single scale for all types of shoe constructions, there will result complaints of misfitting in those cases where a half size larger should have been selected.

It is, therefore, another object of this invention to provide a double scale of shoe sizes on the rule portion of the measuring device, one of the scales being standard for regular lasts of men, women, children and infants, the other scale being employed for particular women's shoe constructions requiring an increase of one half size over other types of women's shoe constructions.

Still other objects of the invention are to improve generally the efficiency of shoe size measuring devices, and especially to provide a novel and improved device of this type which will not only be reliable and accurate in usage, but further be economical in manufacture.

The novel features which I believe to be characteristic of my invention are set forth in particularity in the appended claims. The invention itself, however, both as to its organization and method of operation, will best be understood by reference to the following description taken in connection with the drawing, in which I have indicated diagrammatically an arrangement whereby my invention may be carried into effect.

In the drawing:—

Fig. 1 shows a plan view of the measuring device, as well as its manner of use,

Fig. 2 shows a side view of the device.

Referring now to the drawing, wherein like reference characters in the two figures designate the same elements, it will be seen that the measuring device comprises a rule bar 1 provided with a heel bar 2 arranged transversely to the bar 1. The coupling between the two bars is accomplished by a screw 3. The length of bar 2 is sufficient to provide for comfortable positioning of one foot on each side of the bar 1. The numeral 4 designates the slidable stop bar which has a length equal to that of bar 2.

In actual construction the slidable bar 4 is provided with an aperture 5 whose dimensions are one inch by one half inch. The dimensions of the bar 1 are such as to permit the stop 4 to slide smoothly along bar 1. The bar I is also provided with a fixed stop 6 to prevent the sliding bar 4 from sliding off the bar I. The stop 6 also functions as a support for the rule bar I when the device is in use. That is, when stop 6 and heel bar 2 are in contact with the floor, the slider 4 is able to slide along bar I smoothly without contacting with the floor. The stop 6 further functions as a grip in carrying the device.

On one face 7 of the rule bar I there is provided a plurality of lines 8. The line 8 nearest the heel bar 2 is in actual construction disposed about 3.77 inches from the inner face of the heel bar. The spacing between lines 8 is about 0.167 inch. It is to be clearly understood that actual dimensions given herein are merely illustrative, and are not limiting in any way since the dimensions will vary in accordance with circumstances to be encountered in actual use. The rule bar I is shown broken at the lower portion thereof, but it will be understood that the distance between the lowermost line 8 and stop 6 may be made as great as desired.

As explained above, two scales are provided on the rule bar I. One of these scales 9 begins at the top line 8 and ends at the lowest line. The central scale 9 commences at size 2, and, after advancing by half sizes to size 13½, begins with size 1 and advances by half sizes to size 13. This scale is used for the regular lasts of women's, men's, children's and infants' shoes. The second scale is made in duplicate, one of the pair being numbered 10 and the other being designated 10'. Both scales 10 and 10' begin with size 12 at the line 8 which has middle scale 11½ on it, and advance by half sizes to 13½ to begin again with size 1 and end with size 11.

It will be observed that each of the outer scale sizes is one half size larger than the corresponding middle scale size. The outer scales are used when determining foot size for women's welt, McKay and very short running last constructions. Of course the scales 9, 10, 10' and lines 8 can be printed directly on face 7 of bar I, or they can be printed on a strip of paper and the latter can be pasted to the face 7. Again, the lines 8 and scale numerals may be impressions in face 7 produced by a die, and in that case the impressions can be filled in with a coloring dye. It is further pointed out that for emphasis the outer scales 10 and 10' may be printed in one color, and the middle scale 9 in a strongly contrasting color, the lines 8 being in a still different color or the color of one of the scales.

In actual use, and as shown in Fig. 1 by dotted lines, the feet II, II' of the customer are placed on the floor, the customer standing; one foot II being disposed on one side of bar I, the other foot II' being disposed on the other side of the rule bar. The feet are positioned between the inner face of rear heel bar 2 and the inner face of the slidable member 4 as shown in Fig. 1. The member 4 is of sufficient thickness to contact with the toes of each foot II and II'. If one of the feet should be longer than the other, as is too often the case, the bar 4 will only contact with the toe of the longer foot, and thus automatically impart to the fitter the correct shoe size.

If both feet are of the same size, and the middle scale need only be used, the shoe fitter will note no spacing between the inner face of the slider and the toes of either foot, and will read the appropriate middle scale size. If, on the other hand, the shoe is of a construction requiring the use of the special scale, it will only be necessary for the fitter to read along scales 10 and 10'. Thus it becomes unnecessary to rely on the fitter to remember to add one half size to the normal scale reading.

The special scale is made in duplicate to prevent confusion between scales 9 and 10. If the duplicate scale 10' were omitted, it might well be that the shoe fitter would accidentally read the scale 9 instead of the correct scale 10. In Fig. 1 the dotted line position of the slider 4 shows its appearance when foot II' is longer than foot II, a space 4' existing between foot II and slider 4. This will immediately inform the fitter of the difference in foot sizes, and will thus call his attention to the need for taking the reading of the longer foot. A bore 6' is provided adjacent stop 6 to permit hanging of the device. The material used in constructing the device may be wood, metal or any other material adapted for the purpose of this invention.

While I have indicated and described a system for carrying my invention into effect, it will be apparent to one skilled in the art that my invention is by no means limited to the particular organization shown and described, but that many modifications may be made without departing from the scope of my invention, as set forth in the appended claims.

What I claim is:—

1. A shoe size measuring device comprising a scale bar, a heel bar rigidly and immovably affixed to one end of the scale bar at the middle thereof and providing a pair of extensive heel abutment members, a member slidably mounted on said scale bar solely for longitudinal movement thereon and providing a toe abutment portion for each of said heel portions, a pair of shoe size scales of different ranges provided on a face of said scale bar, said scales being arranged in parallel relation, said heel bar and slidable member being parallel and of the same length whereby the spaces between said pair of heel and toe portions are adapted to simultaneously receive the feet of the individual whose shoe size is to be measured.

2. A shoe size measuring device comprising a scale bar, a heel bar rigidly and immovably affixed to one end of the scale bar at the middle thereof and providing a pair of extensive heel abutment members, a member slidably mounted on said scale bar solely for longitudinal movement thereon and providing a toe abutment portion for each of said heel portions, a pair of shoe size scales of different ranges provided on a face of said scale bar, said scales being arranged in parallel relation, the spaces between said pair of heel and toe portions being adapted to simultaneously receive the feet of the individual whose shoe size is to be measured, said slidable member being normally parallel to said heel bar and of the same length, and the slidable member being provided with an aperture through which said scale bar passes, said aperture being sufficiently large to permit the slidable member to smoothly slide over the scale bar.

3. A shoe size measuring device comprising a scale bar, a heel bar rigidly and immovably affixed to one end of the scale bar at the middle thereof and providing a pair of extensive heel abutment members, a member slidably mounted on said scale bar solely for longitudinal movement thereon and providing a toe abutment portion for each of said heel portions, a pair of shoe size scales of different ranges provided on a face of said scale bar, said scales being arranged in parallel relation, the spaces between said pair of heel and toe portions being adapted to simultaneously receive the feet of the individual whose shoe size is to be measured, said heel bar and slidable member being of the same length and being arranged in parallel relation, one of said scales being longer than the other and being arranged centrally of said scale bar face, the other scale being arranged adjacent an outer edge of said face, and a third scale which is a duplicate of the last named scale arranged on the remaining outer edge of said face.

4. A shoe size measuring device comprising a scale bar, a heel bar rigidly and immovably affixed to one end of the scale bar at the middle thereof and providing a pair of extensive heel abutment members, a member slidably mounted on said scale bar solely for longitudinal movement thereon and providing a toe abutment portion for each of said heel portions, a pair of shoe size scales of different ranges provided on a face of said scale bar, said scales being arranged in parallel relation, said heel bar and slidable member being parallel and of the same length whereby the spaces between said pair of heel and toe portions are adapted to simultaneously receive the feet of the individual whose shoe size is to be measured, one of said scales being arranged centrally of said scale bar face and being adapted to use with substantially all types of shoes, the other scale being arranged adjacent an outer edge of said face and being adapted for use with special types of shoes.

LESTER L. LEVY.